(12) United States Patent
Werner (10) Patent No.: US 11,185,970 B2
(45) Date of Patent: Nov. 30, 2021

(54) HAND-HELD POWER TOOL

(71) Applicant: Robert Bosch GmbH, Stuttgart (DE)

(72) Inventor: Immanuel Werner, St. Johann (DE)

(73) Assignee: Robert Bosch GmbH, Stuttgart (DE)

( * ) Notice: Subject to any disclaimer, the term of this patent is extended or adjusted under 35 U.S.C. 154(b) by 633 days.

(21) Appl. No.: 15/559,769

(22) PCT Filed: Mar. 1, 2016

(86) PCT No.: PCT/EP2016/054292
§ 371 (c)(1),
(2) Date: Sep. 19, 2017

(87) PCT Pub. No.: WO2016/150659
PCT Pub. Date: Sep. 29, 2016

(65) Prior Publication Data
US 2018/0065239 A1    Mar. 8, 2018

(30) Foreign Application Priority Data

Mar. 23, 2015 (DE) ..................... 10 2015 205 149.8

(51) Int. Cl.
*B25D 17/24* (2006.01)
*B25F 5/00* (2006.01)
(Continued)

(52) U.S. Cl.
CPC ............ *B25D 17/24* (2013.01); *B25D 11/064* (2013.01); *B25D 11/125* (2013.01); *B25F 5/001* (2013.01);
(Continued)

(58) Field of Classification Search
CPC .... B25D 17/24; B25D 11/064; B25D 11/125; B25D 2217/0092; B25F 5/006; B25F 5/001; F16F 7/116
(Continued)

(56) References Cited

U.S. PATENT DOCUMENTS

| 7,451,833 | B2 * | 11/2008 | Hahn | ..................... | B25D 17/24 |
| | | | | | 173/104 |
| 2008/0029282 | A1 * | 2/2008 | Ikuta | ..................... | B25D 17/24 |
| | | | | | 173/114 |
| 2009/0025949 | A1 * | 1/2009 | Aoki | ..................... | B23D 51/16 |
| | | | | | 173/162.1 |

FOREIGN PATENT DOCUMENTS

| DE | 20 2005 021 085 U1 | 3/2007 |
| DE | 10 2012 203 758 A1 | 9/2013 |

(Continued)

OTHER PUBLICATIONS

International Search Report corresponding to PCT Application No. PCT/EP2016/054292, dated May 6, 2016 (German and English language document) (7 pages).

*Primary Examiner* — Anna K Kinsaul
*Assistant Examiner* — Himchan Song
(74) *Attorney, Agent, or Firm* — Maginot, Moore & Beck LLP (57) ABSTRACT

A hand-held power tool includes at least one transmission housing, at least one single-stage transmission unit, at least one motor housing, and at least one compensating unit. The at least one transmission unit is disposed in the at least one transmission housing. The at least one compensating unit includes at least one movably mounted compensating mass element. The at least one compensating unit is disposed at least for the most part in the at least one transmission housing or between the at least one transmission housing and the at least one motor housing.

11 Claims, 10 Drawing Sheets

(51) Int. Cl.
  *B25D 11/12* (2006.01)
  *F16F 7/116* (2006.01)
  *B25D 11/06* (2006.01)

(52) U.S. Cl.
  CPC ............. *B25F 5/006* (2013.01); *F16F 7/116* (2013.01); *B25D 2217/0092* (2013.01)

(58) Field of Classification Search
  USPC ............. 173/162.1, 162.2, 201, 210, 211, 90
  See application file for complete search history.

(56) References Cited

FOREIGN PATENT DOCUMENTS

| | | |
|---|---|---|
| EP | 1 736 283 A2 | 12/2006 |
| EP | 2 018 939 A2 | 1/2009 |
| JP | 2006-62039 A | 3/2006 |
| JP | 2006-62044 A | 3/2006 |
| JP | 2007-1005 A | 1/2007 |
| JP | 2009-45732 A | 3/2009 |
| WO | 2011/072918 A1 | 6/2011 |

\* cited by examiner

HAND-HELD POWER TOOL

This application is a 35 U.S.C. § 371 National Stage Application of PCT/EP2016/054292, filed on Mar. 1, 2016, which claims the benefit of priority to Serial No. DE 10 2015 205 149.8, filed on Mar. 23, 2015 in Germany, the disclosures of which are incorporated herein by reference in their entirety.

BACKGROUND

The disclosure is based, in particular, on a hand-held power tool.

There is already known a hand-held power tool having at least one transmission housing, having at least one single-stage transmission unit disposed in the transmission housing, having at least one motor housing, and having at least one compensating unit, which comprises at least one movably mounted compensating mass element.

SUMMARY

The disclosure is based, in particular, on a hand-held power tool having at least one transmission housing, having at least one single-stage transmission unit disposed in the transmission housing, having at least one motor housing, and having at least one compensating unit, which comprises at least one movably mounted compensating mass element. It is proposed that the compensating unit be disposed at least for the most part in the transmission housing or between the transmission housing and the motor housing. "For the most part in the transmission housing" in this context is to be understood to mean, in particular, that the compensating unit is disposed with at least 50 percent, preferably by 75 percent, and particularly preferably 100 percent of its compensating unit volume within the transmission housing. "Disposed between the transmission housing and the motor housing" in this context is to be understood to mean that the compensating unit is in direct contact with the transmission housing and with the motor housing. In particular, a motor shaft extends out of the motor housing, at least substantially through a geometric mid-point and/or through a centroid of the compensating unit, into the transmission housing. Advantageously, a movement plane of the compensating mass element of the compensating unit extends perpendicularly in relation to a main rotation axis of a motor haft out of the motor housing. The compensating mass element is constituted, advantageously, by a sheet metal part. Furthermore, advantageously, the compensating mass element is produced by a punching and/or bending process.

The hand-held power tool is designed to be transported by an operator without the use of a transport machine. In particular, the hand-held power tool has a mass of less than 50 kg, preferably less than 20 kg, and particularly preferably less than 10 kg. A "single-stage transmission unit" in this context is to be understood to mean, in particular, that transmission of torque is effected from a motor shaft directly to an eccentric transmission element, which is designed to drive an eccentric, and directly to a hammer-tube transmission element. In particular, the motor shaft is in direct contact with the eccentric transmission element and the hammer-tube transmission element. Advantageously, the eccentric transmission element is constituted by an output shaft having an integrated toothing and/or an integrated eccentric. Preferably, the hammer-tube transmission element is constituted by an output shaft that has a toothing for driving the hammer tube, and a toothing for coupling to the motor shaft. The motor shaft is designed to be directly driven by a motor, in particular an electric motor, and/or to be driven by a transmission downstream of the motor. In particular, the motor shaft is provided between the eccentric transmission element and the hammer-tube transmission element. Furthermore, advantageously, rotation axes of the motor shaft, eccentric transmission shaft and hammer-tube transmission element lie in a common plane.

The compensating unit advantageously comprises at least one housing unit, within which there are disposed at least the movably mounted compensating mass element and at least one spring element. The compensating mass element is coupled to the at least one spring element, and is designed to be put into motion, preferably made to oscillate, in order thereby to reduce the vibration amplitudes of the hand-held power tool that occur during operation of the hand-held power tool. The housing unit of the compensating unit preferably comprises two housing parts, which are connected to each other in a form-fitting and force-fitting manner. Advantageously, owing to the disposition, according to the disclosure, of the compensating unit, hitherto unused space present in the hand-held power tool can be utilized. Further, advantageously, for the disposition of the compensating unit, the dimensions of the hand-held power tool can be retained. Moreover, particularly advantageously, owing to the disposition of the compensating unit in the transmission housing, the quantity of grease within the transmission housing can be reduced.

Further, it is proposed that the compensating unit have a maximum extent, along a longitudinal axis of the compensating unit, that corresponds at least substantially to a maximum extent of a transmission receiving space of the transmission housing along a longitudinal axis of the transmission housing. Advantageously, the hand-held power tool can thereby be of a particularly compact design. Further, a particularly high reduction in the quantity of grease within the transmission housing can be achieved. The longitudinal axis of the compensating unit and the longitudinal axis of the transmission housing, in an assembled state, are each preferably perpendicular to two mutually opposite delimiting surfaces of the compensating unit that are farthest apart from each other and/or parallel to a direction of movement of the compensating mass element. Preferably, the longitudinal axis of the compensating unit is parallel to a tool rotation axis of the hand-held power tool. A "transmission receiving space" of the transmission housing is to be understood to mean, in particular, a space designed to receive a transmission. In particular, the transmission receiving space is delimited, at least partly, by the transmission housing.

Furthermore, it is proposed that the single-stage transmission unit comprise at least transmission element that at least partly overlaps the compensating unit. A particularly high reduction of vibration can thereby be achieved. Further, a particularly high component density can be achieved within the hand-held power tool. The transmission element preferably comprises a transmission shaft, a toothed wheel and/or an eccentric wheel. In particular, the at least one transmission element and the compensating unit intersect one same plane, which is parallel to the movement plane of the compensating mass element.

Furthermore, it is proposed that the compensating unit have at least one lead-through opening, through which the transmission element extends, at least partly. A particularly high reduction of vibration can thereby be achieved. Further, a total structural space of the transmission housing, motor housing and compensating unit can be kept particularly small.

Further it is proposed that the compensating unit have at least one main contact surface, which at least for the most part bears against the transmission housing. Particularly secure supporting of the compensating unit on the transmission housing can thereby be achieved. Further, a play between the compensating unit and the transmission housing can be kept particularly small, enabling a particularly high reduction of vibration to be achieved. In particular, the main contact surface bears directly against the transmission housing.

It is additionally proposed that the compensating unit have at least one further main contact surface, which at least for the most part bears against the motor housing. Particularly secure supporting of the compensating unit on the motor housing can thereby be achieved. Further, a play between the compensating unit and the motor housing can be kept particularly small, enabling a particularly high reduction of vibration to be achieved. In particular, the further main contact surface bears directly against the motor housing.

Furthermore, it is proposed that the compensating unit be realized as a sub-assembly that can be preassembled. It is thereby possible, advantageously, to achieve particularly simple and rapid assembly of the hand-held power tool. "That can be preassembled" in this context is to be understood to mean that a plurality of components of the compensating unit are preassembled and integrated, as a whole, in a complete system, in particular in a hand-held power tool. The compensating unit preferably has at least one fastening element, which is designed to be separably connected to the complete system.

Further, it is proposed that the compensating mass element be realized, at least partly, as a hollow body. Further components, in particular spring elements, can thereby act in combination with the compensating mass element in a particularly space-saving manner. Particularly preferably, the compensating mass element comprises at least one tubular receiving region.

Furthermore, it is proposed that the compensating mass element have at least one lead-through opening for lead-through of at least one transmission element of the transmission unit. A centroid of the compensating mass element can thereby be moved, particularly advantageously, into proximity of the transmission element, enabling particularly good reduction of vibration to be achieved. Further, an existing space can be utilized particularly efficiently. The lead-through opening of the compensating mass element is preferably constituted by an oblong hole.

Furthermore, it is proposed that the compensating unit have at least one housing unit, which at least partly surrounds an eccentric element of the transmission unit. Advantageously, a required structural space can thereby be reduced.

The hand-held power tool according to the disclosure is not intended in this case to be limited to the application and embodiment described above. In particular, the hand-held power tool according to the disclosure may have individual elements, components and units that differ in number from a number stated herein, in order to fulfill a principle of function described herein.

BRIEF DESCRIPTION OF THE DRAWINGS

Further advantages are disclosed by the following description of the drawing. Two exemplary embodiments are represented in the drawing. The drawing, the description and the claims contain numerous features in combination. Persons skilled in the art will also expediently consider the features individually and combine them to create appropriate further combinations.

There are shown in.

DETAILED DESCRIPTION

Figure 1:
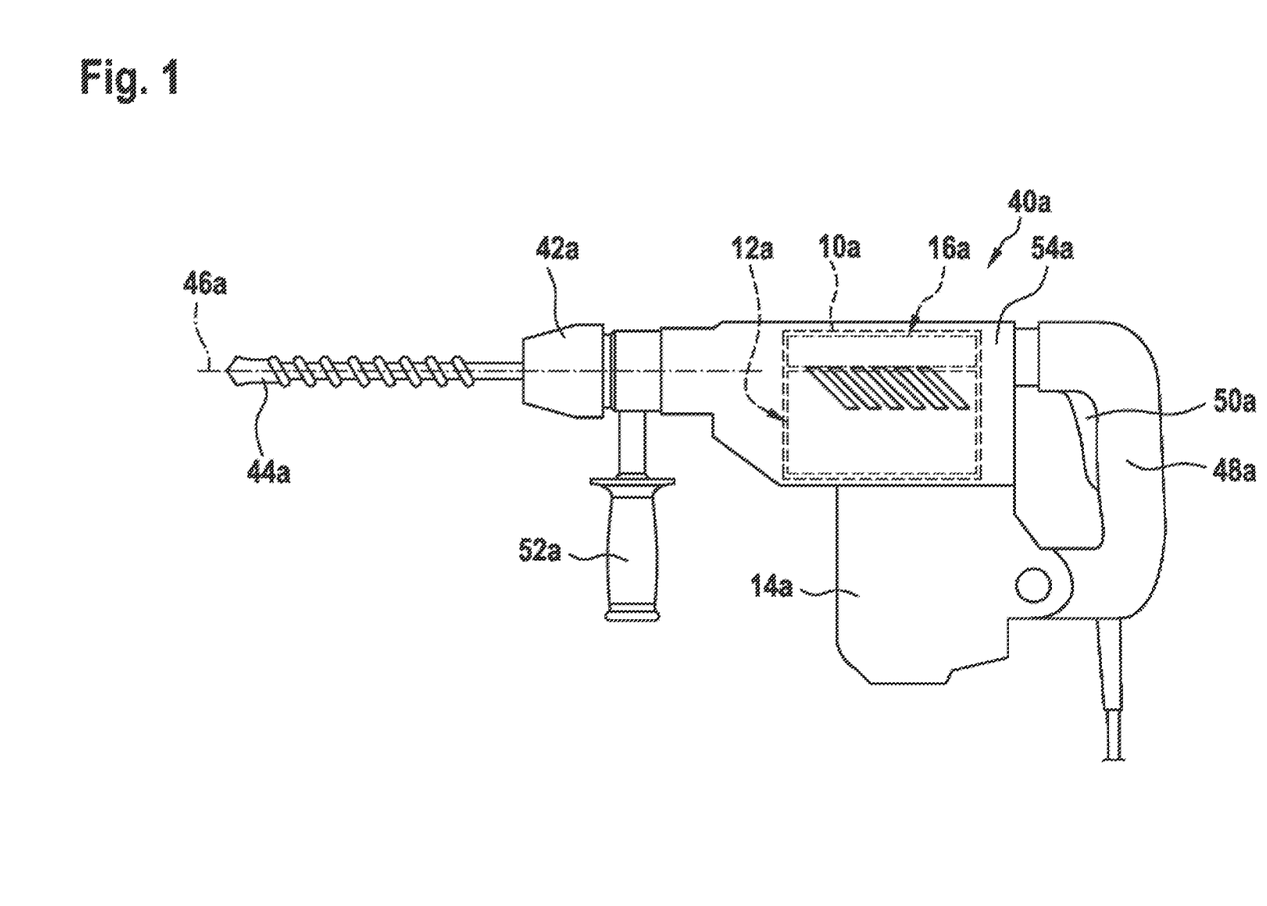
FIG. 1 a hand-held power tool, in a side view.

FIG. 1 shows a hand-held power tool which is constituted as a hammer drill 40a. The hand-held power tool comprises a tool receiver 42a. The tool receiver 42a is designed to receive an insert tool 44a. In a drilling mode, the tool receiver 42a rotates about the main rotation axis 46a. In addition to the drilling mode, a percussion mode may also be set. For the purpose of handling, the hand-held power tool has a handle 48a having an actuating means 50a. The actuating means 50a is realized as a pushbutton, and designed for manual control of the hand-held power tool. The hand-held power tool has a further handle 52a, which is designed for guiding the hand-held power tool with a further hand. The hand-held power tool has a machine housing 54a. The hand-held power tool has a transmission housing 10a. As indicated schematically, the transmission housing 10a is disposed inside the machine housing 54a. The hand-held power tool comprises a single-stage transmission unit 12a. The single-stage transmission unit 12a is disposed in the transmission housing 10a. The hand-held power tool comprises a motor housing 14a. The motor housing 14a is disposed outside of the machine housing 54a. Disposed inside the motor housing 14a there is an electric motor, not shown in greater detail. The hand-held power tool comprises a compensating unit 16a. The compensating unit 16a is disposed inside the transmission housing 10a.

Figure 2:
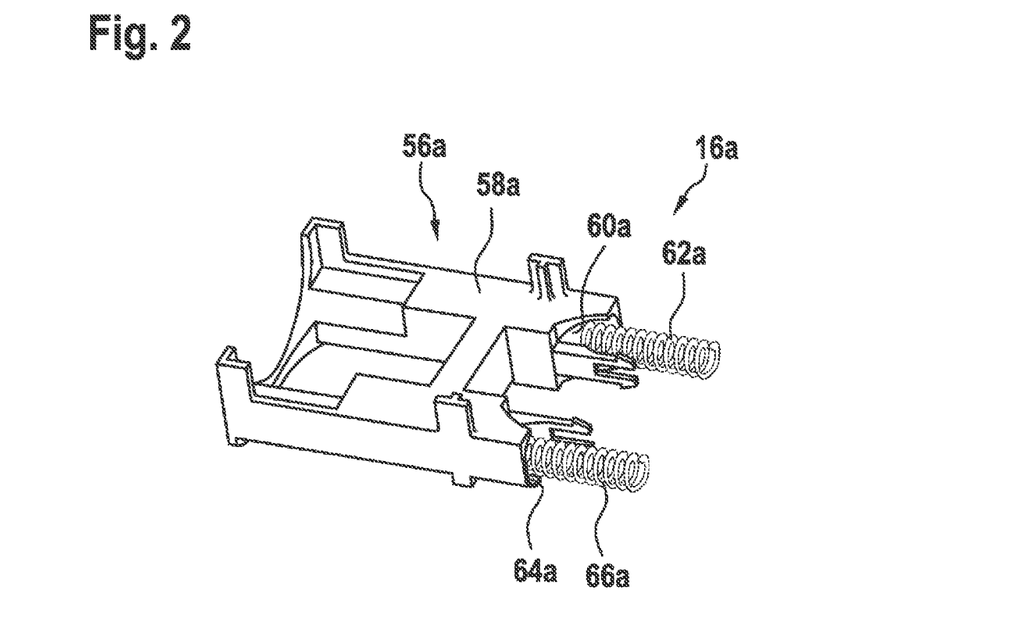
FIG. 2 a perspective view of a part of a compensating unit of the hand-held power tool, in a first assembly step, FIG. 3 a perspective view of a part of the compensating unit according to FIG. 2, in a further assembly step, FIG. 4 a perspective view of the compensating unit according to FIG. 2, in a further assembly step, FIG. 5 a sectional representation of the compensating unit according to FIG. 2, FIG. 6 a detail view of the compensating unit according to FIG. 2, FIG. 7 a perspective view of a transmission housing of the hand-held power tool and of the compensating unit, before assembly, FIG. 8 a perspective view of the transmission housing of the hand-held power tool and of the compensating unit, in an assembled state, FIG. 9 a sectional view of the transmission housing of the hand-held power tool and of the compensating unit, in an assembled state, FIG. 10 a perspective view of the assembled transmission housing with a transmission cover, FIG. 11 a perspective view of a part of an alternative compensating unit of the hand-held power tool, in a first assembly step, FIG. 12 a perspective view of a compensating mass element of the alternative compensating unit according to FIG. 11, FIG. 13 a sectional representation of the compensating mass element according to FIG. 12, FIG. 14 a perspective view of the compensating unit according to FIG. 11, in a further assembly step, FIG. 15 a perspective view of the compensating unit according to FIG. 11, in an assembled state, FIG. 16 a side view of an alternative transmission housing of the hand-held power tool with the compensating unit according to FIG. 11, FIG. 17 a perspective view of a motor housing of the hand-held power tool with the compensating unit according to FIG. 11, and FIG. 18 a sectional representation through the compensating unit, the transmission housing and the motor housing, in an assembled state.

A part of the compensating unit 16a is represented in FIG. 2. The compensating unit 16a comprises a housing unit 56a. The housing unit 56a has a first housing part 58a. The first housing part 58a has a first recess 60a. The first recess 60a is realized in the form of a cylinder. The compensating unit 16a has a first spring element 62a. The first spring element 62a constitutes a helical spring. The first recess 60a is designed to receive the first spring element 62a. In a first assembly step, the first spring element 62a is introduced into the first recess 60a. The first housing part 58a has a second recess 64a. The second recess 64a is realized in the form of a cylinder. The compensating unit 16a has a second spring element 66a. The second spring element 66a constitutes a helical spring. The second recess 64a is designed to receive the second spring element 66a. In the first assembly step, the second spring element 66a is introduced into the second recess 64a.

Figure 3:
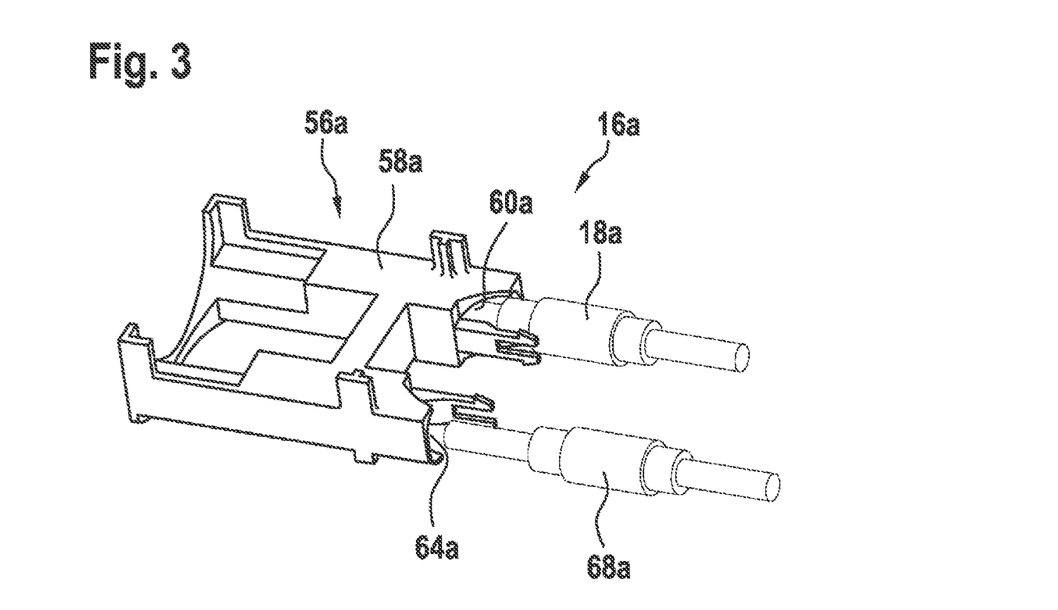

As shown in FIG. 3, the compensating unit 16a has a first compensating mass element 18a. The compensating unit 16a has a second compensating mass element 68a. The first compensating mass element 18a is realized in the form of a cylinder. The first compensating mass element 18a has cylinder diameters that differ in succession along a longitudinal extent of the mass element. The first compensating mass element 18a and the second compensating mass element 68a are identical in design. The first compensating mass element 18a is disposed inside the housing unit 56a. More precisely, the first compensating mass element 18a is disposed inside the first recess 60a. The second compensating mass element 68a is disposed inside the housing unit 56a. More precisely, the second compensating mass element 68a is disposed inside the second recess 64a. The compensating mass elements 18a, 68a are mounted in a movable manner inside the housing unit 56a. The compensating mass elements 18a, 68a are coupled to the spring elements 62a, 66a and designed to be made to oscillate.

Figure 4:
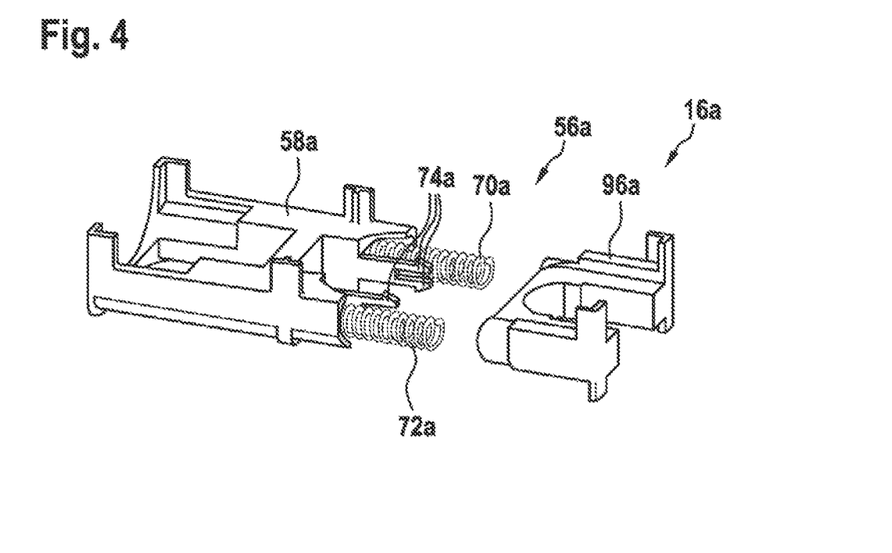

As shown in FIG. 4, the compensating unit 16a has a third spring element 70a. The third spring element 70a constitutes a helical spring. The first recess 60a is designed to receive the third spring element 70a. In a further assembly step, the third spring element 70a is introduced into the first recess 60a. The compensating unit 16a has a fourth spring element 72a. The fourth spring element 72a constitutes a helical spring. The second recess 64a is designed to receive the fourth spring element 72a. In the further assembly step, the fourth spring element 66a is introduced into the second recess 64a.

The housing unit 56a comprises a second housing part 96a In an assembly step, the second housing part 96a is latched with the first housing part 58a. The housing unit 56a comprises latching means 74a, which are designed to produce a latching connection. The second housing part 96a comprises recesses designed to receive the third spring element 70a and the fourth spring element 72a.

Figure 5:
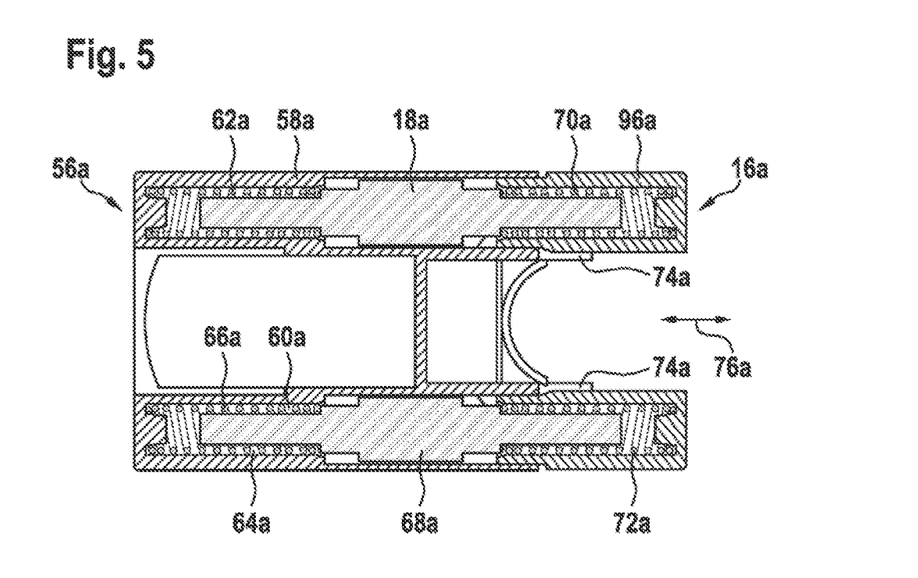
Figure 6:
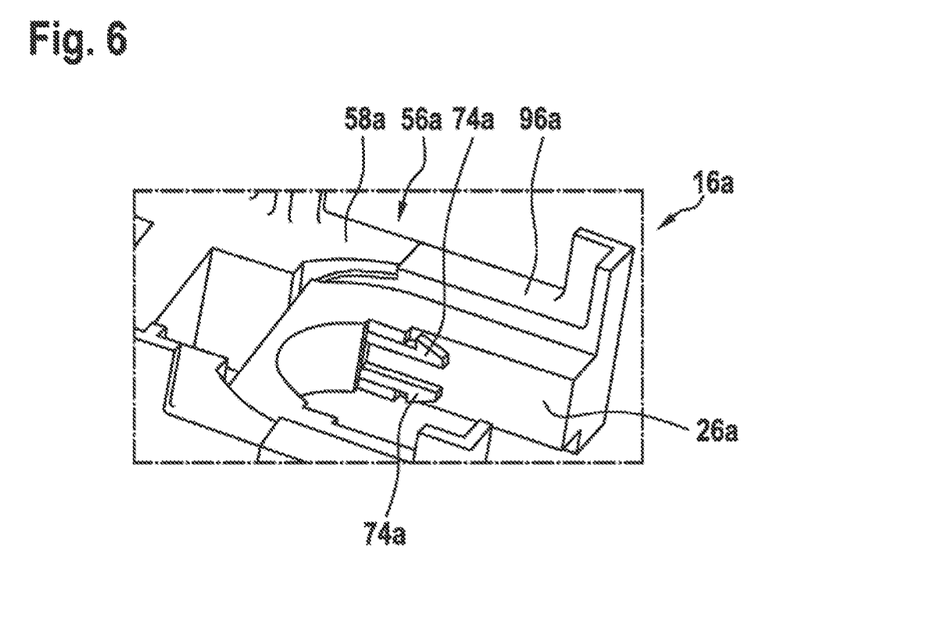

FIG. 5 shows the compensating unit 16a in an assembled state. The compensating unit 16a is realized as a subassembly that can be preassembled. The first housing part 58a and the second housing part 96a are connected to each other in a form-fitting manner via the latching means 74a. The spring elements 62a, 66a, 70a, 72a are biased in compression. The spring elements 62a, 66a, 70a, 72a press the first housing part 58a and the second housing part 96a apart in a longitudinal direction 76a. The longitudinal direction 76a is parallel to the rotational symmetry axis of the compensating mass element 18a. In an assembled state, the longitudinal direction 76a is parallel to the main rotation axis 46a. The first housing part 58a and the second housing part 96a are realized so as to be movable in relation to each other. More precisely, the first housing part 58a and the second housing part 96a are realized so as to be displaceable in relation to each other in the longitudinal direction 76a. The first housing part 58a and the second housing part 96a can be moved toward each other, contrary to a spring force of the spring elements 62a, 66a, 70a, 72a, until they strike against each other (FIG. 5).

Figure 7:
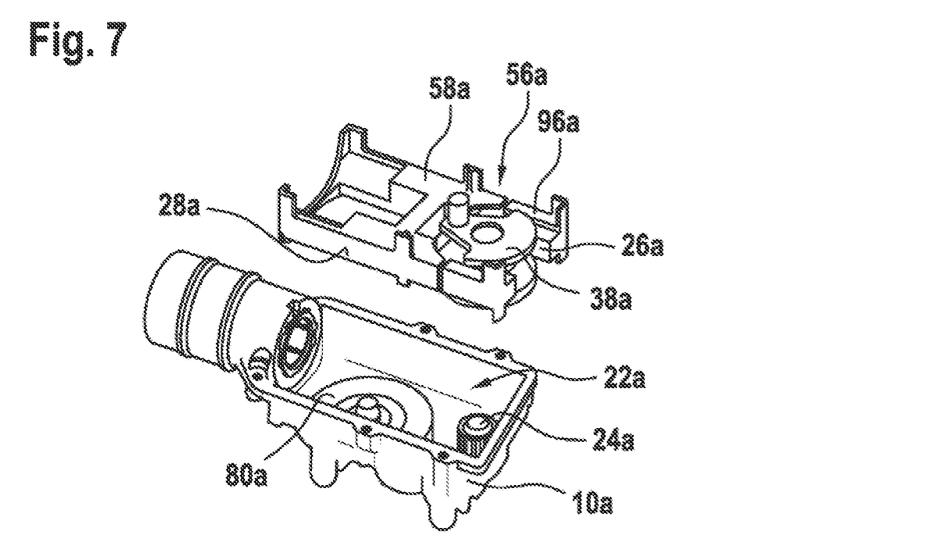
Figure 8:
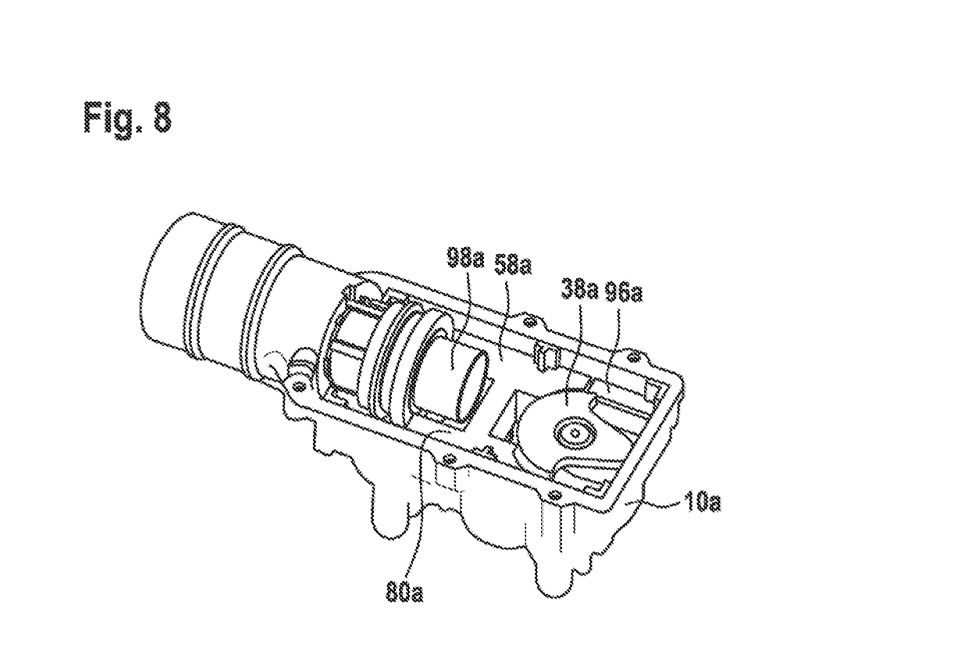
Figure 9:
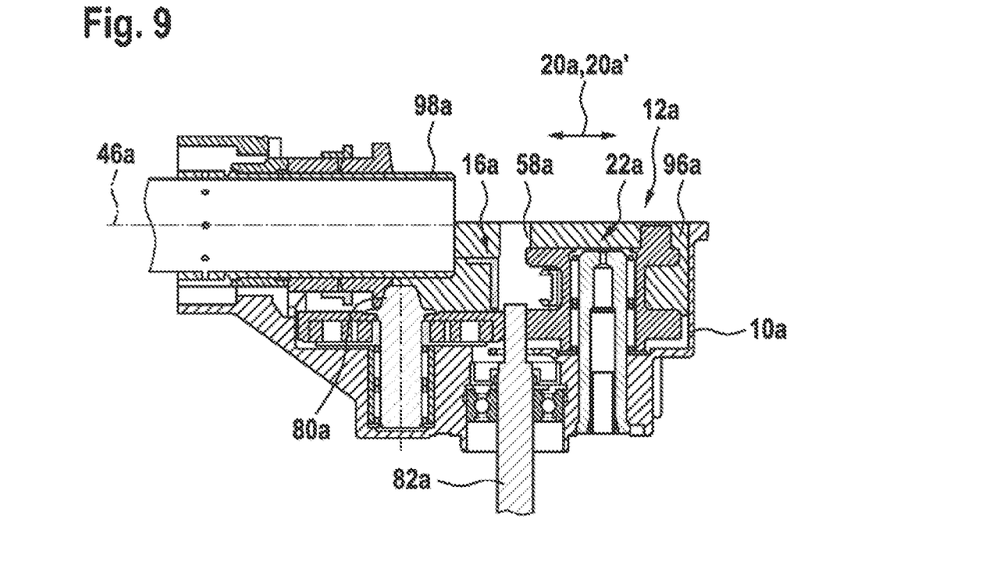

FIGS. 7 to 9 show the transmission housing 10a and the compensating unit 16a prior to assembly. The transmission housing 10a delimits a transmission receiving space 22a in the form of a half-shell. The single-stage transmission unit 12a comprises a first transmission element 24a. The single-stage transmission unit 12a comprises a second transmission element 80a. The first transmission element 24a is realized as an eccentric transmission element. The first transmission element 24a is designed to drive an eccentric element 38a. The eccentric element 38a is designed to drive a percussion mechanism, not shown in greater detail. The housing unit 56a partly surrounds the eccentric element 38a of the transmission unit 12a.

The compensating unit 16a has a lead-through opening 26a. The lead-through opening 26a is realized in the shape of a U. The first transmission element 24a overlaps the compensating unit 16a in an assembled state. More precisely, the first transmission element 24a extends through the lead-through opening 26a. In an assembled state, the first transmission element 24a is in direct contact with a motor shaft 82a. The second transmission element 80a is realized as a hammer-tube transmission element. The second transmission element 80a is designed to drive a hammer tube 98a. In an assembled state, the second transmission element 80a is in direct contact with the motor shaft 82a. The first transmission element 24a and the second transmission element 80a are disposed so as to be non-contacting of each other.

In FIG. 8, the compensating unit 16a has been inserted in the transmission housing 10a. The compensating unit 16a has a main contact surface 28a, as shown in FIG. 7, which for the most part bears against the transmission housing 10a. The main contact surface 28a in this case bears directly against the transmission housing 10a. The compensating unit 16a has a maximum extent, along a longitudinal axis 20a of the compensating unit 16a, that corresponds at least substantially to a maximum extent of the transmission receiving space 22a of the transmission housing 10a along a longitudinal extent 20a' of the transmission housing 10a. In the assembled state, the longitudinal axis 20a is parallel to the main rotation axis 46a. The compensating unit 16a has a maximum extent, transversely in relation to the longitudinal axis 20a of the compensating unit 16a, that corresponds at least substantially to a maximum extent of the transmission receiving space 22a of the transmission housing 10a transversely in relation to the longitudinal axis 20a' of the transmission housing 10a.

Figure 10:
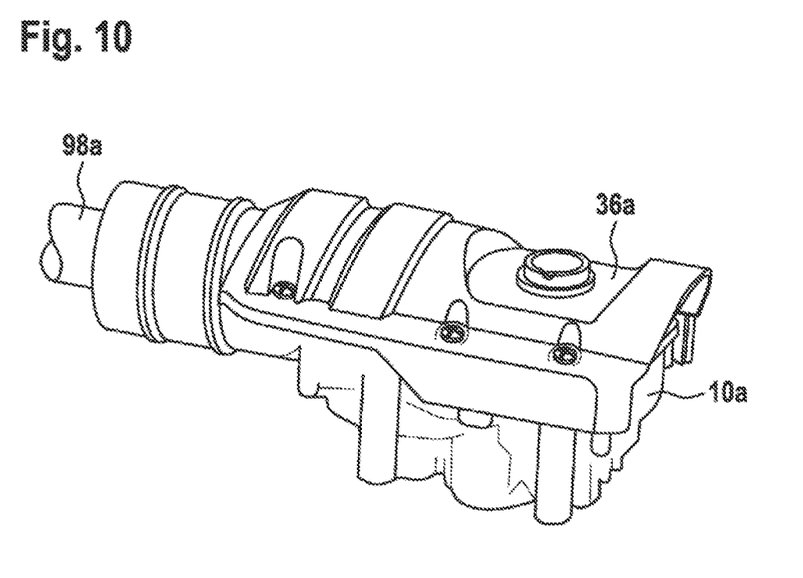

As shown in FIG. 10, the hand-held power tool has a housing cover 36a. In the assembled state, the housing cover 36a is disposed on the transmission housing 10a. The housing cover 36a closes off the transmission receiving space 22a. The compensating unit 16a is disposed entirely in the transmission housing 10a. The housing cover 36a fixes the compensating unit 16a relative to the transmission housing 10a in a vertical direction. The vertical direction is parallel to a rotation axis of the motor shaft 82a.

A further exemplary embodiment of the disclosure is shown in FIGS. 11 to 18. The description and the drawings that follow are limited substantially to the differences between the exemplary embodiments, and in principle reference may also be made to the drawings and/or the description of the other exemplary embodiment of FIGS. 1 to 10 in respect of components that have the same designation, in particular in respect of components denoted by the same references. To distinguish the exemplary embodiments, the letter a has been appended to the references of the exemplary embodiment in FIGS. 1 to 10. In the exemplary embodiments of FIGS. 11 to 18, the letter a has been replaced by the letter b.

Figure 11:
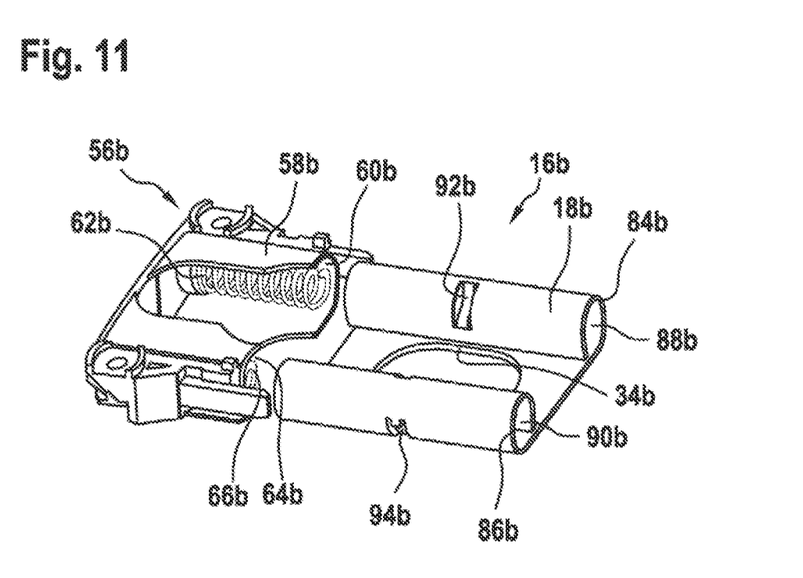
Figure 12:
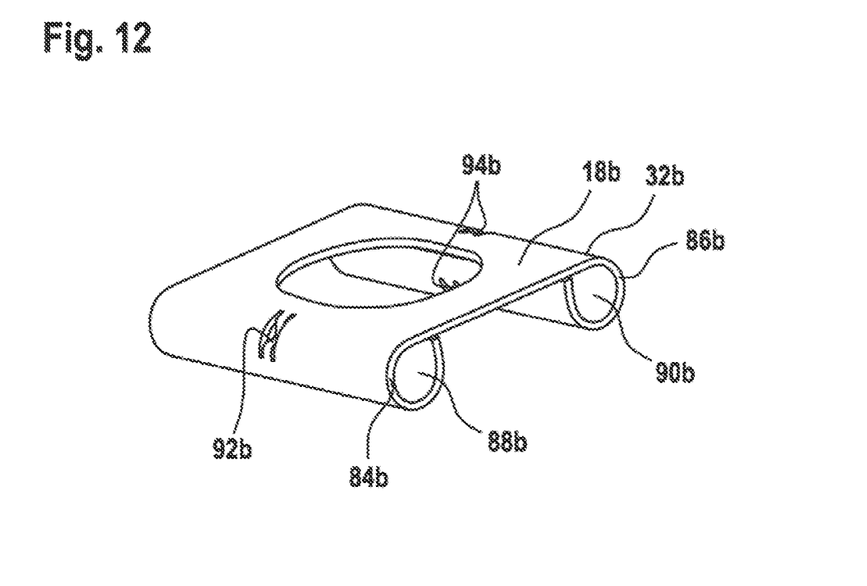
Figure 13:
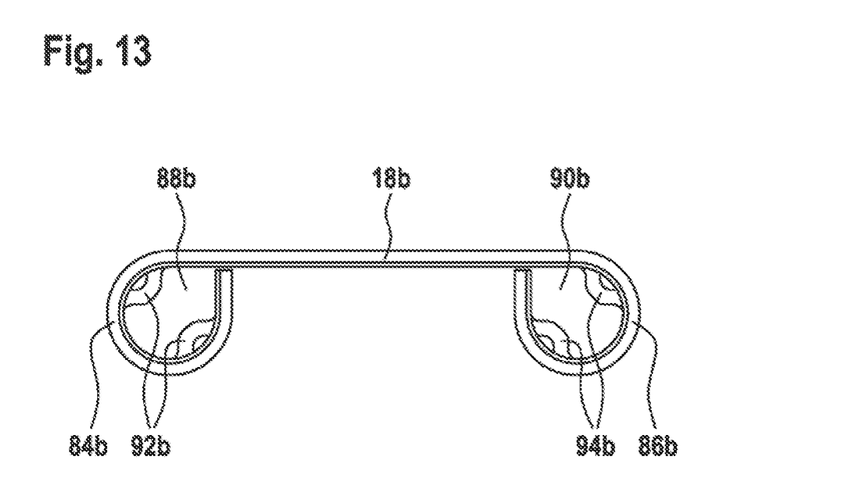

FIG. 11 shows a part of an alternatively realized compensating unit 16b of a hand-held power tool. The hand-held power tool corresponds in its basic structure to that of the hand-held power tool shown in FIG. 1. The compensating unit 16b comprises a housing unit 56b. The housing unit 56b has a first housing part 58b. The first housing part 58b has a first recess 60b. The compensating unit 16b has a first spring element 62b. The first spring element 62b is constituted by a helical spring. The first recess 60b is designed to receive the first spring element 62b. In a first assembly step, the first spring element 62b is introduced into the first recess 60b. The first housing part 58b has a second recess 64b. The compensating unit 16b has a second spring element 66b. The second spring element 66b constitutes a helical spring. The second recess 64b is designed to receive the second spring element 66b. In the first assembly step, the second spring element 66b is introduced into the second recess 64b.

The compensating unit 16b comprises a movably mounted compensating mass element 18b. The compensating mass element 18b is represented in greater detail in FIGS. 12 and 13. The compensating mass element 18b is constituted by a sheet metal part. More precisely, the compensating mass element 18b realizes a sheet metal absorber. The compensating mass element 18b is produced in a punching and/or bending process. The compensating mass element 18b has a lead-through opening 34b. The lead-through opening 34b of the compensating mass element 18b is constituted by an oblong hole. The lead-through opening 34b is disposed centrally in a planar surface of the compensating mass element 18b. The compensating mass element 18b is realized in part as a hollow body 32b. The compensating mass element 18b has a planar main extent, opposite end regions 84b, 86b being bent by 270°. The end regions 84b, 86b each realize a tubular receiving region 88b, 90b. In an assembly step, the compensating mass element 18b is introduced into the recesses 60b, 64b. The end regions 84b, 86b in this case receive the spring elements 62b, 66b. Blocking elements 92b, 94b are disposed as viewed in a direction of longitudinal extent of the compensating mass element 18b. The blocking elements 92b, 94b project into the receiving regions 88b, 90b. The blocking elements 92b, 94b are designed to bear against the spring elements 62b, 66b. The blocking elements 92b, 94b are constituted by bent parts. The blocking elements 92b, 94b are realized such that they are integral with the compensating mass element 18b.

Figure 14:
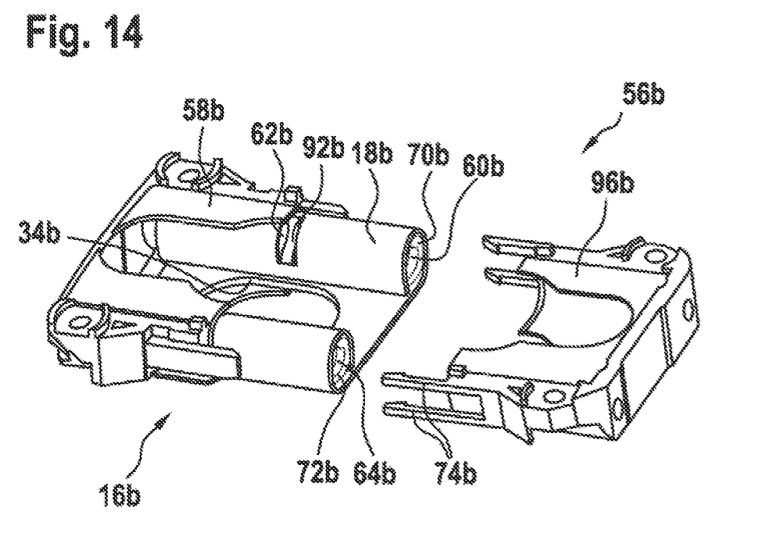

As shown in FIG. 14, the compensating unit 16b has a third spring element 70b. The third spring element 70b constitutes a helical spring. The first recess 60b is designed to receive the third spring element 70b. In a further assembly step, the third spring element 70b is introduced into the first recess 60b. The compensating unit 16b has a fourth spring element 72b. The fourth spring element 72b constitutes a helical spring. The second recess 64b is designed to receive the fourth spring element 72b. In the further assembly step, the fourth spring element 72b is introduced into the second recess 64b.

The housing unit 56b comprises a second housing part 96b. In an assembly step, the second housing part 96b is latched with the first housing part 58b. The housing unit 56b comprises latching means 74b, which are designed to produce a latching connection. The second housing part 96b comprises recesses designed to receive the compensating mass element 18b, the third spring element 70b and the fourth spring element 72b.

Figure 15:
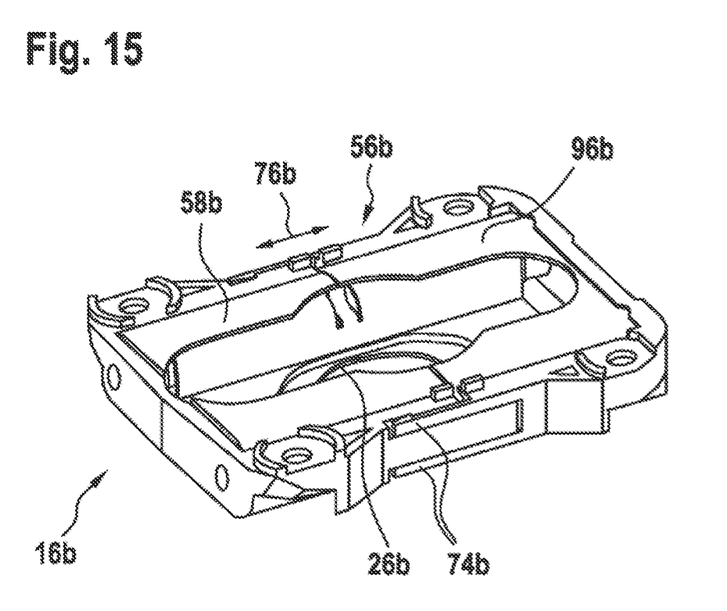

FIG. 15 shows the compensating unit 16b in an assembled state. The compensating unit 16b is realized as a subassembly that can be preassembled. The first housing part 58b and the second housing part 96b are connected to each other in a form-fitting manner via the latching means 74b. The spring elements 62b, 66b, 70b, 72b are biased in compression. The spring elements 62b, 66b, 70b, 72b press the first housing part 58b and the second housing part 96b apart in a longitudinal direction 76b. The first housing part 58b and the second housing part 96b are realized so as to be movable in relation to each other. More precisely, the first housing part 58b and the second housing part 96b are realized so as to be displaceable in relation to each other in the longitudinal direction 76b. The first housing part 58b and the second housing part 96b can be moved toward each other, contrary to a spring force of the spring elements 62b, 66b, 70b, 72b, until they strike against each other.

Figure 16:
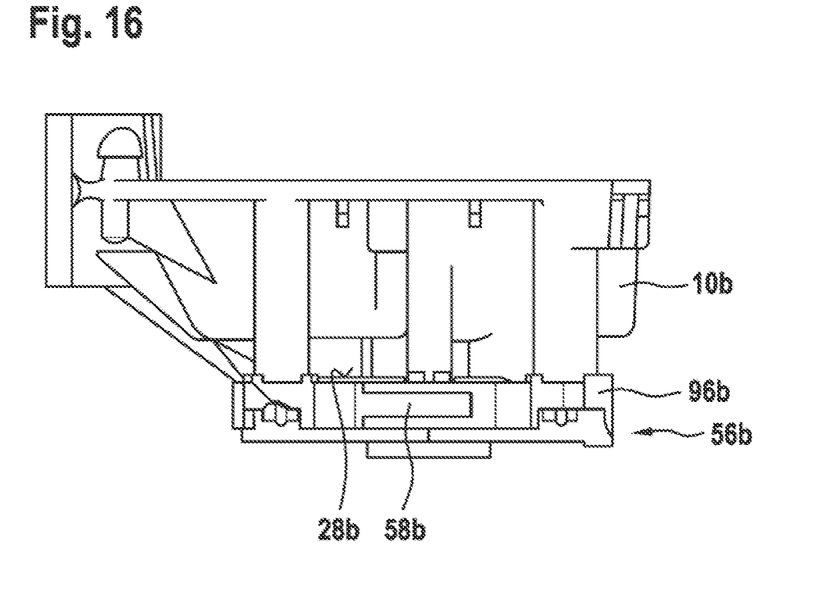
Figure 17:
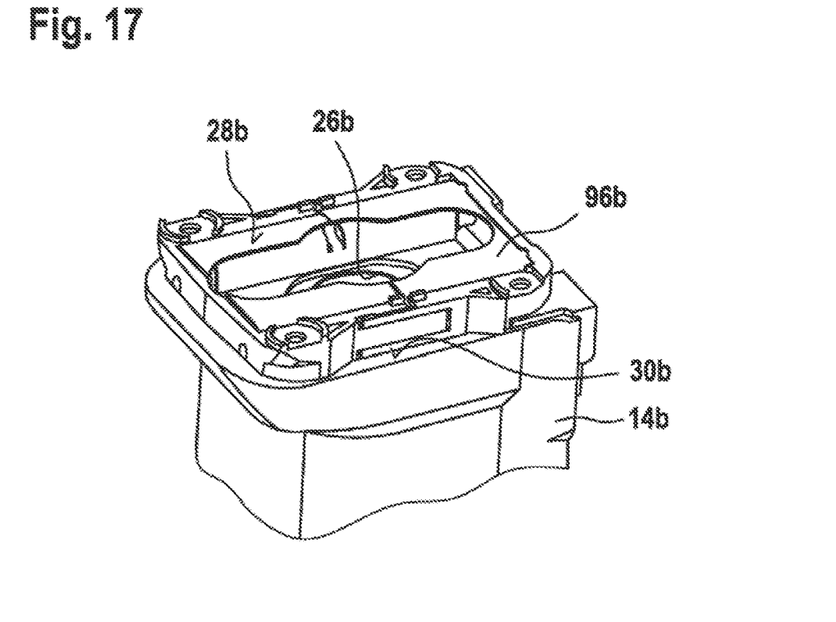
Figure 18:
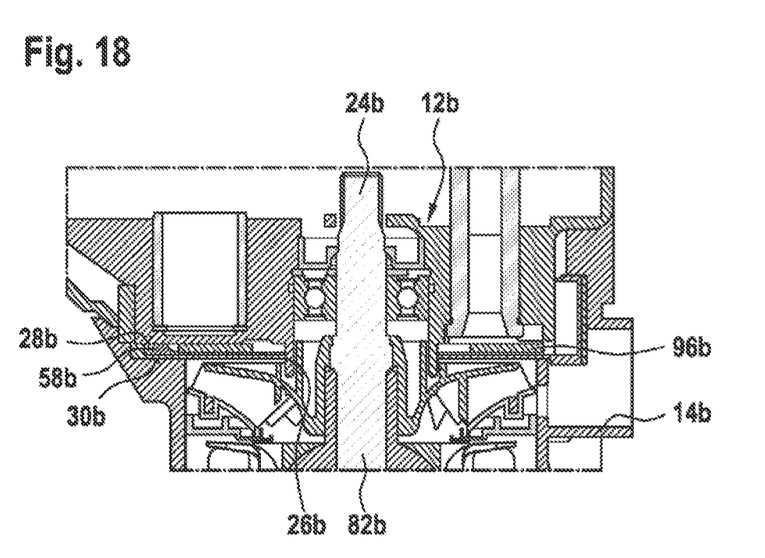

As shown in FIG. 16, the hand-held power tool has a transmission housing 10b. The compensating unit 16b has a main contact surface 28b, which for the most part bears against the transmission housing 10b. The main contact surface 28b bears directly against the transmission housing 10b. The main contact surface 28b bears against an exterior of the transmission housing 10b. As further shown in FIGS. 17 and 18, the hand-held power tool has a motor housing 14b. The compensating unit 16b has a further main contact surface 30b, which for the most part bears against the motor housing 14b. The further main contact surface 30b bears directly against the motor housing 14b. A motor shaft 82b projects out of the motor housing 14b. As represented in FIG. 18, the hand-held power tool has a transmission unit 12b. The transmission unit 12b is realized as a single stage. The structure of the transmission unit 12b in this case corresponds to that of the transmission unit 12a shown in the first exemplary embodiment. The transmission unit 12b is disposed in the transmission housing 10b. The motor shaft 82b realizes a transmission element 24b of the transmission unit 12b. The transmission element 24b partly overlaps the compensating unit 16b. The compensating unit 16b has a lead-through opening 26b. The lead-through opening 26b is designed for lead-through of the transmission element 24b of the transmission unit 12b. As further shown in FIG. 18, the compensating unit 16b is disposed between the transmission housing 10b and the motor housing 14b.

The invention claimed is:

1. A hand-held power tool, comprising:
   at least one transmission housing;
   at least one single-stage transmission unit disposed in the at least one transmission housing;
   at least one motor housing; and at least one compensating unit including:
at least one compensating mass element;
a housing unit having:
   a first housing part that includes at least one first recess defined along a longitudinal direction; and
   a second housing part that includes at least one second recess defined along the longitudinal direction, the second housing part connected to the first housing part via a form fit such that the at least one compensating mass element is moveably mounted in the first and second recesses defined along the longitudinal direction;
wherein, the at least one compensating unit is disposed (i) such that a majority of the at least one compensating unit is within the at least one transmission housing, or (ii) between the at least one transmission housing and the at least one motor housing, and
wherein the at least one compensating mass element includes at least one lead-through opening configured to lead-through at least one transmission element of the at least one transmission unit.

2. The hand-held power tool as claimed in claim 1, wherein:
the at least one transmission housing includes a transmission receiving space;
an extent of the at least one compensating unit along a first longitudinal axis of the at least one compensating unit substantially corresponds or is matched to an extent of the transmission receiving space of the at least one transmission housing along a second longitudinal axis of the at least one transmission housing; and
the at least one compensating unit and the at least one single-stage transmission unit are received in the transmission receiving space such that the at least one single-stage transmission unit intersects with the at least one compensating unit on a plane parallel to a movement plane of the at least one compensating unit.

3. The hand-held power tool as claimed in claim 1, wherein the at least one single-stage transmission unit includes at least one transmission element that overlaps the at least one compensating unit, at least in part.

4. The hand-held power tool as claimed in claim 3, wherein:
the at least one compensating unit further includes at least one lead-through opening; and
the at least one transmission element extends partly or fully through the at least one lead-through opening.

5. The hand-held power tool as claimed in claim 1, wherein the at least one compensating unit further includes at least one main contact surface configured to bear against the at least one transmission housing.

6. A hand-held power tool, comprising:
at least one transmission housing;
at least one single-stage transmission unit disposed in the at least one transmission housing;
at least one motor housing; and
at least one compensating unit including:
at least one compensating mass element
a housing unit having:
   a first housing part that includes at least one first recess defined along a longitudinal direction; and
   a second housing part that includes at least one second recess defined along the longitudinal direction, the second housing part connected to the first housing part via a form fit such that the at least one compensating mass element is moveably mounted in the first and second recesses defined along the longitudinal direction;
wherein, the at least one compensating unit is disposed (i) such that a majority of the at least one compensating unit is within the at least one transmission housing, or (ii) between the at least one transmission housing and the at least one motor housing,
wherein the at least one compensating unit further includes at least one main contact surface configured to bear against the at least one transmission housing, and
wherein the at least one compensating unit has at least one further main contact surface configured to bear against the at least one motor housing.

7. The hand-held power tool as claimed in claim 1, wherein the at least one compensating unit is a preassembled sub-assembly.

8. A hand-held power tool, comprising:
at least one transmission housing;
at least one single-stage transmission unit disposed in the at least one transmission housing;
at least one motor housing; and
at least one compensating unit including:
at least one compensating mass element
a housing unit having:
   a first housing part that includes at least one first recess defined along a longitudinal direction; and
   a second housing part that includes at least one second recess defined along the longitudinal direction, the second housing part connected to the first housing part via a form fit such that the at least one compensating mass element is moveably mounted in the first and second recesses defined along the longitudinal direction;
wherein, the at least one compensating unit is disposed (i) such that a majority of the at least one compensating unit is within the at least one transmission housing, or (ii) between the at least one transmission housing and the at least one motor housing, and
wherein the at least one compensating mass element is configured as a hollow body.

9. The hand-held power tool as claimed in claim 1, wherein the at least one compensating unit further includes at least one housing unit that at least partly surrounds an eccentric element of the at least one transmission unit.

10. The hand-held power tool as claimed in claim 1, wherein the hand-held power tool is a hammer drill and/or a chipping hammer.

11. A hand-held power tool, comprising:
at least one transmission housing;
at least one single-stage transmission unit disposed in the transmission housing;
at least one motor housing; and
at least one compensating unit including at least one movably mounted compensating mass element disposed such that a majority of the at least one compensating unit is between the transmission housing and the motor housing,
wherein the single-stage transmission unit includes a transmission element that overlaps the compensating unit at least in part,
wherein the compensating unit includes at least one lead-through opening and the transmission element extends partly or fully through the at least one lead-through opening; and wherein the transmission element is configured as a motor shaft projecting from said motor housing.

* * * * *